[11] 3,633,989

[72] Inventor Stephen A. Benton
 Cambridge, Mass.
[21] Appl. No. 868,099
[22] Filed Oct. 21, 1969
[45] Patented Jan. 11, 1972
[73] Assignee Polaroid Corporation
 Cambridge, Mass.

[54] METHOD FOR MAKING REDUCED BANDWIDTH HOLOGRAMS
 17 Claims, 7 Drawing Figs.
[52] U.S. Cl. .................................................... 350/3.5
[51] Int. Cl. .................................................... G02b 27/22
[50] Field of Search........................................ 350/3.5

[56] References Cited
 OTHER REFERENCES

Kock, Proceedings of the IEEE, Vol. 54 pp. 331 (2/1966).
Upatnieks, J. Opt. Soc. Am., Vol. 58, No. 4, pp. 589– 90 (4/1968).

*Primary Examiner*—David Schonberg
*Assistant Examiner*—Robert L. Sherman
*Attorneys*—Brown and Mikulka, William D. Roberson, Gerald L. Smith and Frederick H. Brustman ABSTRACT: A method for making a low bandwidth stereoscopic hologram of a subject. Vertical parallax is eliminated to reduce information content. The remainder is transformed to a larger area thereby reducing the information spatial density of the resulting hologram. A narrow horizontal aperture is the means for limiting vertical parallax. The resulting hologram is suitable for television transmission. To view a stereoscopic image of the original subject a real image of the aperture is formed from the resulting hologram. An observer looks through the aperture image as if it were a window to view the stereoscopic subject image.

INVENTOR.
STEPHEN A. BENTON

METHOD FOR MAKING REDUCED BANDWIDTH HOLOGRAMS

BACKGROUND

This invention relates to a method for making stereoscopic holographic images. More particularly the invention is directed to a method of substantially reducing the information content and information spatial density of a conventional holographic image. A pleasing stereoscopic effect is retained in the reconstructed image.

Holography, photography by wave front reconstruction, has become very widely known in a short period of time. This is due to the unusually realistic three-dimensional qualities of images reconstructed from holograms. Generally, making a hologram, that is a holographic image of a subject, requires the use of coherent light. Reconstructing a stereoscopic image of the subject stored in the hologram does not require using coherent light, but it enhances the reconstructed image's appearance. A laser is particularly useful as a source of coherent light for practicing the invention disclosed herein.

A widely used method for making a hologram is described in J. Opt. Soc. Amer. 54 (1964) 1,295 by E. Leith and J. Upatnieks. The method requires that light having temporal and spatial coherence be divided into two components. By temporal and spatial coherence is meant specific phase relationships and forms between successive light waves. Division from a common source insures mutual coherence between components. One component is used to illuminate the subject whose holographic image is to be recorded. Light is reflected by the subject. Contained in the light waves reflected from the subject is all possible optical information about it. A detector, for example a photographic place capable of recording a very fine detail, is positioned to receive the light reflected from the subject. The second light component is directly incident on the same photographic place. It has a wave front of known and reproducible form. Having a known and reproducible wave front, it can serve as a reference against which the first light wave, modulated in phase and form by the shape and optical properties of the subject, can be compared. In practice the comparison is made by interfering the reference wave front and the reflected wave front at the photographic plate. Diffraction patterns uniquely related to the subject result from the interference. A hologram is the record of this pattern. In normal photography an enormous amount of information in the form of phase-modulation is discarded. Optical interference with the reference beam is the means used to convert phase modulation into a recordable quantity. Viewing is done by illuminating the holographic image with a light beam having a waveform and direction similar to that of the reference light. Light is diffracted from the beam by the recorded holographic pattern. The diffracted light forms a wave front identical in form and direction to the one originally emanating from the subject. An observer viewing this diffracted waveform sees a three-dimensional image of the original subject. All optical clues to stereoscopy possessed by the original subject are present. Viewing is generally done by looking through the plate on which the holographic image is recorded as if it were a window. A virtual image is seen. The virtual image appears, in relation to he hologram, where the subject did. All visual experiences possible from viewing the subject through a window the size of the hologram are available from the holographic reconstruction. Foremost is striking three-dimensionality.

Holography is a means of reducing three-dimensional imagery to a two-dimensional format and subsequently reconstructing the three-dimensional imagery. Television is limited to two-dimensional formats. Combining holography with television offers the possibility of providing viewers with stereoscopic scenes. Holographic techniques are used to reduce three-dimensional scenes to a two-dimensional format compatible with television broadcasting. Television methods transmit the holographic images. Holographic techniques are applied at the receiving end to convert the two-dimensional television transmission into a viewable stereoscopic image.

The photosensitive surface can be an image orthicon or other scanning detector and signal generator. Using such a detector, a holographic image can be scanned and a signal generated and transmitted without intermediate storage steps.

Television systems do not have the ability to handle the high1spatial density information associated with holograms. Broadcasting bandwidth is not available to transmit and receive the 20 or more frames each second required to suppress perceptible motion flicker for the viewer. Photographic reproduction of holograms is limited too. Photographic duplication of holograms requires using relatively insensitive photographic materials.

Holographic information content far exceeds requirements for viewing pleasing three-dimensional images. Little is gained from the plethora of information. Much of it is redundant. A method for selectively reducing information is desirable if the holographic technique is to be widely used for stereoscopic viewing and television.

An article in 7 *Applied Optics* 545 (1968) by L. H. Lin suggests that holographic information content can be reduced by eliminating vertical parallax without sacrificing a pleasing three-dimensional appearance. A small, select, area of a first hologram is reproduced in multiple copies. The copies have the same high-spatial information density of the original. The copies are assembled in a mosaic having sufficient area for comfortable viewing. Total information content is limited, but nothing is done to reduce the high-information spatial density; that is the information content per unit measure of receiving medium. It remains too high for use with low-resolution films or television systems.

SUMMARY

Three-dimensional effects are perceived visually in several ways. Binocular stereoscopic vision, including binocular parallax, is a most important means of perceiving depth and three-dimensional qualities. Parallax is very important too. By parallax is means the apparent displacement of an object of image as seen from different points. Prior experience subconsciously effects three-dimensional perception.

Human binocular vision is horizontally oriented. A viewer needs only a few horizontal perceptives to see stereoscopically. Vertical perspectives can be sacrificed with little loss. The process of this invention for making a hologram having pleasing three-dimensional properties for a viewer, but with a limited information content and spatial density, takes advantage of the horizontal geometry of the human visual system.

This invention concerns a method for producing a stereoscopic hologram having limited information content. Information spatial density is reduced as well. Lower information spatial density makes this holographic process compatible with many existing systems and materials. Information limited holograms according to this invention are suitable for electronic transmission by present means. Image reconstructions are stereoscopic and retain a pleasing and satisfying three-dimensional quality.

A conventional two-beam hologram is made first. Leith's and Upatniek's technique is suitable. Information content is selectively limited by masking off the hologram except for a narrow horizontal aperture preferably wider than normal interocular spacing. A real orthoscopic image is formed by properly illuminating the aperture. Only a selected amount of information is retained in this image. A photosensitive surface is placed in the space occupied by the real image. A low-bandwidth hologram is made by illuminating the surface with a reference light beam to interfere with light forming the information-limited real image. Information spatial density is reduced by expanding the information content of the aperture over the larger real image area. A holographic image of the illuminated aperture is recorded as well as the information-limited real image. The second information-limited hologram is viewed by properly illuminating it to form a real image of the aperture. Realistic stereoscopic images of the original subject are viewed by looking through the aperture image as if it were a window. Sufficient stereoscopic visual cues are retained by the method of this invention so the viewer sees a striking three-dimensional image. Because the second holographic image has a selected amount of information spread over a relatively large area, it is suitable for direct scanning and electronic transmission by television. Modification of the method also described herein eliminates making the conventional hologram as a first step.

An object of this invention is to provide a method of making a hologram having a predetermined information content which can provide a three-dimensional view.

Another object of this invention is to provide a method of making stereoscopic holograms on materials having limited resolution.

Still another object of the invention is to provide a method of making holographic images having total information content and spatial density suitable for electronic scanning and transmission.

Yet another object of this invention is to provide a system for transmitting three-dimensional images.

Other objects of the invention will, in part, be obvious and will, in part, appear hereinafter.

The invention accordingly comprises the several steps and the relation and order of one or more of such steps with respect to each of the others, and the product possessing the features, properties in relation to of the elements which are exemplified in the following detailed disclosure, and the scope of the application of which will be indicated in the claims.

For a fuller understanding of the nature and objects of the invention, reference should be had to the following detailed description taken in connection with the accompanying drawings wherein.

PREFERRED METHOD FOR PRACTICING THE INVENTION

Figure 1:
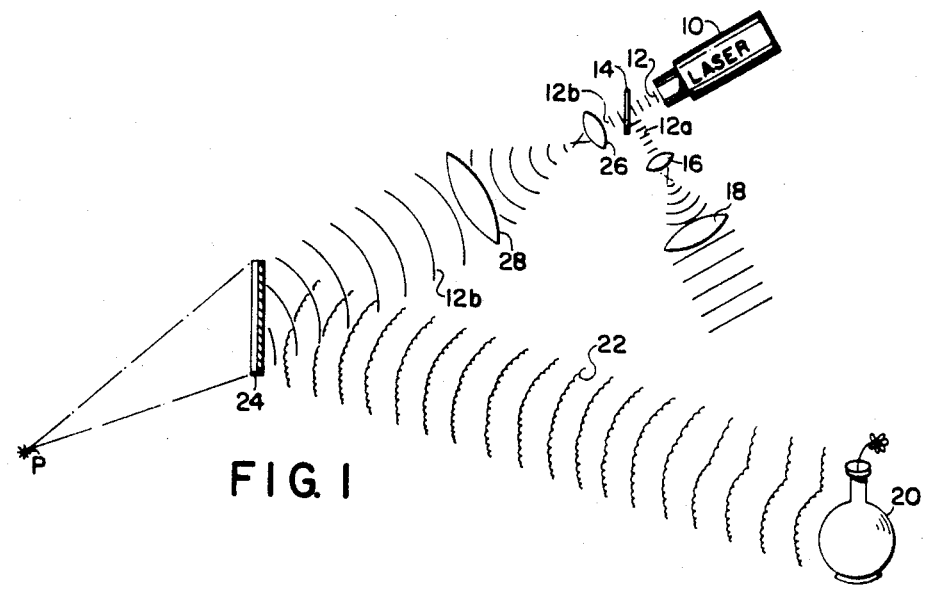
FIG. 1 is an arrangement for making a hologram.

Reference to FIG. 1 should be had. An arrangement is shown for practicing the first step of this invention wherein a conventional hologram is made. Monochromatic coherent light 12 from laser 10 is divided into two components 12a and 12b by beam-splitter 14. Component 12a is directed through a telescopic arrangement containing lenses 16 and 18 to increase the cross section of light beam 12a. It illuminates subject 20. Subject 20 reflects and scatters light from illuminating beam 12a. Wave front 22 is a portion of the light reflected and scattered by subject 20. The form of wave front 20 is functionally related to subject 20. It is incident on a light-sensitive material 24 such as photographic plate. Wave front 22 contains optical information about subject 20. All the information needed to see a three-dimensional stereoscopic view of subject 20 is present therein.

Component 12b of coherent light 12 passes through a telescope comprising lenses 26 and 28 increasing its cross section and imparting a preselected shape to its waveform. Light beam 12b having a preselected waveform is used as a reference. The waveform of beam 12b should be reproducible. To this end it is made to converge on point P. Reference light beam 12b is also incident on light-sensitive surface 24. Interference between light in reference beam 12b and wave fronts 22 forms a complex diffraction pattern uniquely related to subject 20 on photosensitive surface 24. The pattern is a holographic image of subject 20. Holographic images or diffraction patterns are usually too complex to be viewed by normal direct observation in the way conventional photographs are viewed. A special illuminating technique is required to view an image of the subject.

Figure 2:
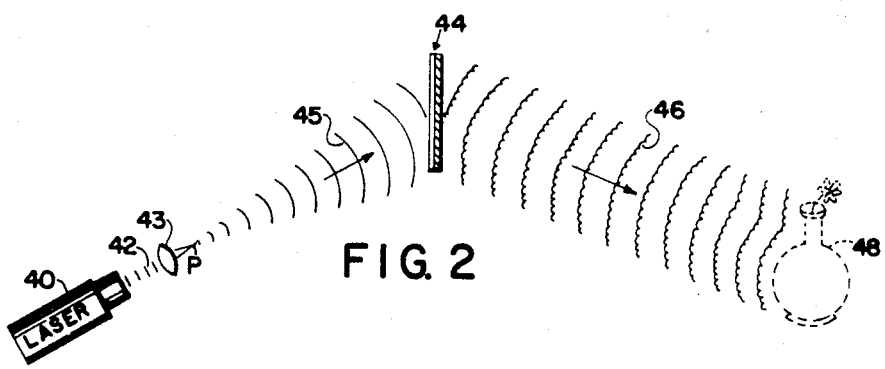
FIG. 2 is an arrangement useful in reconstructing a real orthoscopic image of the subject.

FIG. 2 shows one method suited for illuminating the previously made holographic image 44 and forming a real orthoscopic image 48. Laser 40 emits monochromatic coherent light 42. Lens 43 directs light 42 through focal point P forming a point source thereat and gives it a preselected waveform 45. Direction and waveform 45 of illuminating light beam 42 are selected so it represents the time reverse of reference beam 12b used to make the hologram according to FIG. 1. By time reverse beam is meant a light beam having a direction and waveform, relative to a holographic image, so it appears to emanate from the point to which the original reference beam having the same waveform converged toward. Specifically, if reference beam 12b converged toward P, beyond photosensitive surface 24, the time reverse of reference beam 12b is a light beam appearing, relative to holographic image 44, to emanate P having the same waveform as reference beam 12b. Hologram 44 is made by the method illustrated in FIG. 1. When time reverse illuminating light 45 is incident thereon, the holographic image pattern of hologram 44 diffracts a portion of light 45 into wave fronts 46. In the diffraction process wave fronts 46 are shaped by the holographic image to the same form that wave fronts 22 had. Wave fronts 46 travel in the opposite direction though. A real image 48 is formed by wave fronts 46. Real image 48 is orthoscopic. It can be recorded by placing a photographic material in the space occupied by the image. All the optical information originally transmitted by subject 20 in wave fronts 22 and incident on photosensitive surface 24 is present in image 48.

Figure 3:
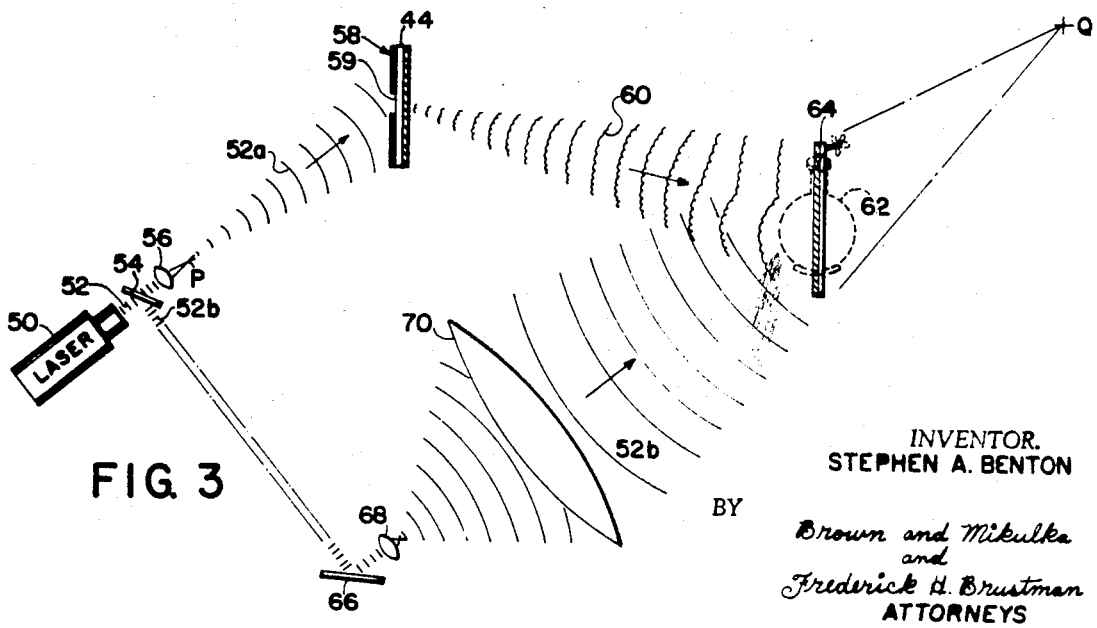
FIG. 3 is an arrangement for making a reduced bandwidth hologram from a conventional hologram.

FIG. 3 illustrates the method for reducing the information content and information spatial density of a real image 48 reconstructed from hologram 44 and making a holographic recording of the result. Laser 50 emits a beam of monochromatic coherent light 52. It is divided by beam-splitter 54 into two components 52a and 52b. Light beam 52a is directed by lens 56 through focal point P and shaped into the time reverse of reference beam 12b originally used to make hologram 44. Mask 58 having a horizontal aperture 59 is placed adjacent hologram 44. Aperture 59 has a large aspect ratio. Aspect ratio is the ratio of the aperture's width to its height. Primary information reduction is achieved by using a narrow aperture. Using a 1 mm. high aperture with a 100 mm. high hologram reduces vertical information content by 100:1. Its width should be at least equal to normal interocular spacing, but preferably wider. Information content of hologram 44 is reduced in this process by the ratio that the masked area bears to the entire hologram area. Because a variety of horizontal perspectives is more important to a pleasing three-dimensional viewing experience, than vertical perspectives, aperture height is reduced in preference to width. It should be understood that hologram 44 could have had a size equal to the aperture's. The need to mask the holographic image would then be eliminated at this stage. Time reverse illuminating beam 52a is incident on hologram 44 through aperture 59. The illuminates portion of hologram 44 diffracts light into a complex wave front 60 which forms a real orthoscopic and stereoscopic image 62. Wave front 60 and image 62 differ substantially from wave fronts 46 and image 48 of FIG. 2. A distinct reduction in information is the difference. Present in wave fronts 46 was information unnecessary for providing a pleasing stereoscopic viewing experience. Extraneous stereoscopic information has been removed from image 62. Information spatial density is reduced by the image transformation between apertured hologram 44 and real stereoscopic image 62. Photosensitive surface 64 is placed near the space occupied by real image 62. It could be a photographic plate or a television orthicon. Coherent reference light 52b is directed onto photosensitive surface 64. Reference light 52b comes from laser 50 via mirror 66 and a telescope comprised of lenses 68 and 70. The telescope increases the cross section of reference light 52b and imparts to it a predetermined waveform focused at Q. Wave fronts 60 and 52b interfere at photosensitive surface 64 forming a holographic image. Unlike the previous holographic image 44 this one has a perceivable image of object 20. Though the pattern on surface 64 bears a superficial resemblance to a normal photographic image, there is a substantial difference. It is a holographic image which can provide pleasing stereoscopic viewing experiences. Holographic information necessary to reconstruct an image of aperture 59 is also stored on photosensitive surface 64. This is an important convenience in viewing the stereoscopic image of subject 20 which has been transferred to surface 64.

Figure 4:
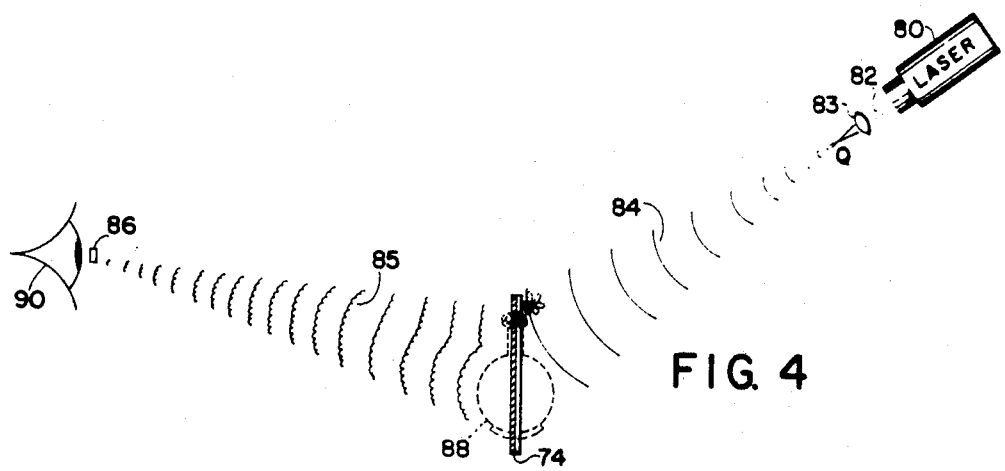
FIG. 4 is an arrangement for viewing a stereoscopic image stored in the reduced bandwidth hologram.

The information and spatial density limited hologram image at surface 64 is fixed and becomes hologram 74 of FIG. 4. A stereoscopic image of subject 20 iv viewed by illuminating information limited hologram 74. A laser 80 which emits monochromatic coherent light 82 illuminates hologram 74. Lens 83 focuses light 82 at point Q imparting to it waveform 84 which is the time reverse of reference light 52b used to make information-limited hologram 74. Hologram 74 diffracts a portion of the incident light 84 into a specific pattern of wave fronts 85. The arrangement as shown in FIG. 4 reconstructs a real image 86 of aperture 59. Viewing an image in three dimensions of subject 20 is accomplished by placing one's eyes at real aperture image 86 and looking through it towards hologram 74 as if aperture image 84 were a window. A real stereoscopic image 88 of subject 20 is seen.

Figure 5:
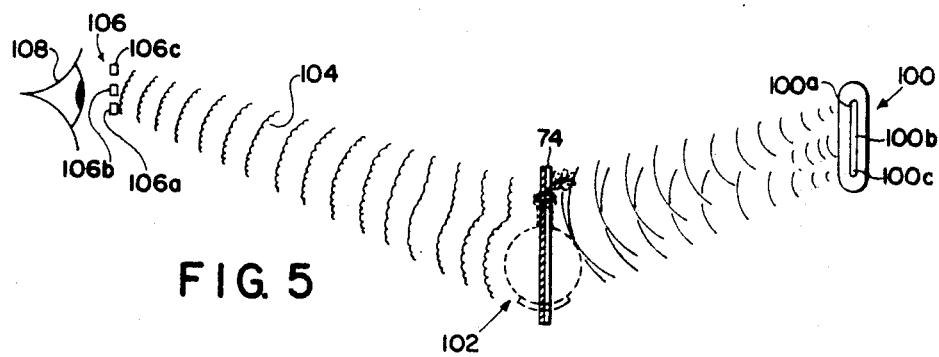
FIG. 5 is an arrangement useful for increasing the viewing space.

The height of real aperture image 86 might be inconveniently small for comfortable viewing. An arrangement for improving viewer comfort while observing stereoscopic image 88 is shown in FIG. 5. A vertical line source of light 100 is used to illuminate hologram 74. Hologram 74, of course, diffracts light from vertical line source 100 into a series of complex wave fronts 104 which now forms a continuum of aperture images 106. One places his eye 108 at the continuum of images 106 looking towards hologram 74 to view an image 102 of subject 20. The continuum of aperture images 106 has a greater area than aperture image 86. It is easier for the eye 108 to be maintained where it can view image 102. Vertical image line source 100 can be considered as a series of point light sources 100a, 100b, and 100c. Individually considered, each point source emits a time reverse reference wave which illuminates hologram 74 and is diffracted thereby into a wave front forming a distinct aperture image at position 106. Point sources 100a, 100b, 100c each produces an aperture image 106a, 106b, and 106c. There is a continuum of point sources on vertical line source 100 so there is a continuum of aperture images 106. If the light source used to reconstruct an image from the hologram is incoherent a speckled appearance often associated with holographic reconstructions is minimized.

Figure 6:
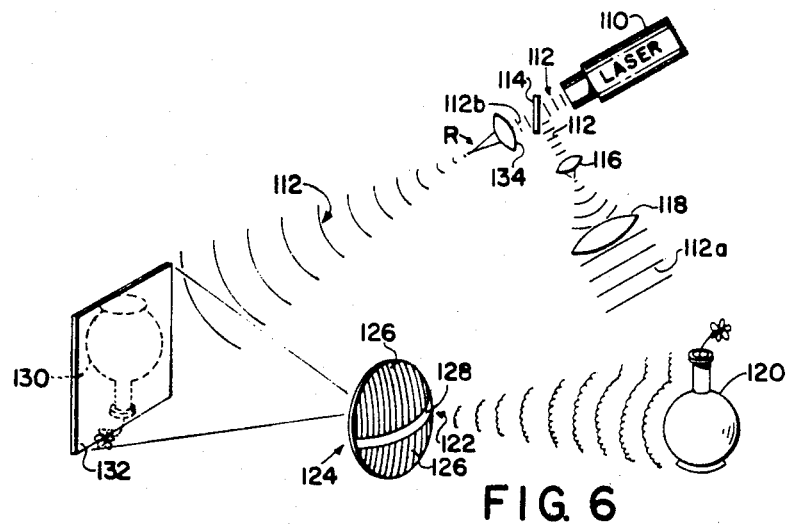
FIG. 6 is an arrangement for making a reduced bandwidth hologram directly.

An information-limited or bandwidth reduced holographic system for use in such fields as television broadcasting should be capable of real time operation. Intermediate procedures must be eliminated. In FIG. 6 is shown an arrangement whereby the method of this invention can be practiced without intermediate steps. Laser 110 emits a coherent beam of light 112 which is divided by beam-splitter 114 into two components 112a and 112b. Light beam 112a has its cross section increased by lenses 116 and 118. It illuminates subject 120. Subject 120 scatters and reflects light into a complex wave front 122 whose form is functionally related to subject 120. A large diameter lens 124 is placed to receive wave front 122 forming a real image 130 of subject 120 on photosensitive surface 132. Information limitation is accomplished by placing a mask 126, having a horizontal aperture 128 adjacent to lens 124. Preferably aperture 128 is horizontal having a width equal to or greater than normal interocular spacing. Its height is determined as above by the information reduction ratio desired. Image 130 is information limited. However, it retains sufficient information to provide a pleasing stereoscopic-viewing experience Information spatial density is reduced in the transformation of light 122 between aperture 128 and photosensitive surface 132. Information spatial density is decreased as before. A monochromatic coherent reference beam 112b is directed onto photosensitive surface 132 where it interferes with image 130 to form a holographic diffraction pattern.

Reference beam 112b is preferably directed toward photosensitive surface 132 from a point R horizontally aligned with and laterally spaced from aperture 128. Separation of various image components during reconstruction is simplified by this arrangement. Reference beam 112b is from laser 110. It is focused at point R and given a predetermined wave front by lens 134. Using a lens 124 in the image transfer and information limiting process results in the image 130 of subject 120 being completely reversed. This is corrected during reconstruction.

Figure 7:
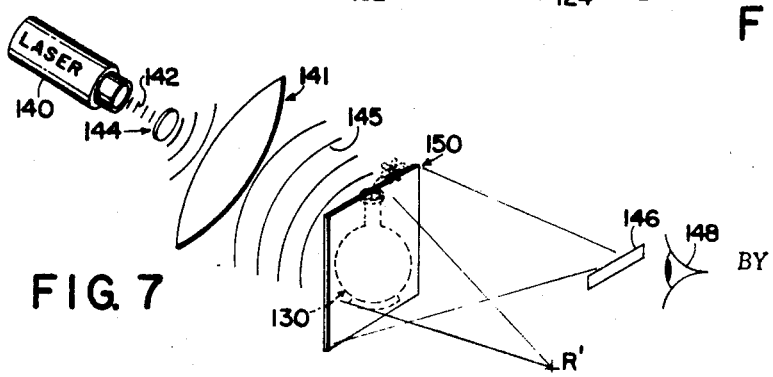
FIG. 7 is an arrangement for viewing a stereoscopic image stored by the one step process.

FIG. 7 illustrates an arrangement for reconstructing and viewing a stereoscopic image of subject 120 from hologram 150. Hologram 150 represents the holographic image formed on photosensitive surface 132 after processing, transmission or fixing, as determined by the nature of surface 132. Laser 140 emits monochromatic coherent light 142 which a telescope comprising lenses 144 and 141 forms into the time reverse wave front 145 of reference beam 112b used to make the hologram. Time reverse reference light 145 illuminates hologram 150. Illuminating hologram 150 by the previous method requires that the image of subject 120 be viewed through the real image of aperture 128. By comparison with subject 120, the real image is reversed in depth. Depth reversal is due to the use of lens 124 to accomplish the transformation from subject 120 to image 130. A second image, reversed in depth, can be made visible by illuminating another diffraction order of the hologram. Being reversed in depth the second image has correct depth relations for a viewer. This alternate diffraction order of hologram 150 is illuminated by aiming time reverse reference wave 145 symmetrically opposite the direction of reference light 112b toward focus at point R. A real aperture image 146 is formed as before. Stereoscopic image 130 is viewed by using aperture image 146 as a window. An upside down mirror image of subject 120 is seen. Rotating holographic image (hologram) 150 corrects this.

By the processes described information content and density can be limited to a preselected value compatible with state of the art television systems and transmission within presently feasible bandwidth. Using a television orthicon pickup as photosensitive surface 132 permits transmission of holographic image 130 when it is formed. If the information content of hologram 130 is sufficiently limited a series of holograms can be transmitted in rapid succession to eliminate the perception of flicker between successive images. Information content of successive holograms is restricted to an amount which can be transmitted over the available bandwidth within the specified interframe or interhologram time period. Reduction of information spatial density permits the use of television scanners having low resolution. This is possible because by the process of this invention holographic images can have their information content restricted to an amount and density compatible with state of the art television systems and transmission bandwidths. Televised holographic image 130 should be displayed at the receiving station on a light-transmitting surface 150. This might require a television receiver with a special display surface.

What is claimed is:

1. A method for making a hologram of a subject comprising the steps of:
    illuminating said subject with light from a selected source to create a wave front reflecting therefrom having a given information content related to said subject;
    limiting the information content of a wave front derived from said reflecting wave front;

forming an information-limited real image of said subject from said information-limited derived wave front;

combining said information-limited real image with a reference wave front of light having a select phase relationship with said information-limited wave front to form an interference pattern;

positioning an image-receiving surface proximate said information-limited real image; and receiving said interference pattern on said image-receiving surface.

2. The method for making a hologram of a subject according to claim 1 wherein said step of illuminating said subject is carried out with a source of coherent light.

3. The method of making a hologram of a subject according to claim 2 wherein said information-limiting step comprises:

transferring a select portion of said derived wave front through an aperture having an aspect ratio representing a substantially large dimension in a direction parallel to a given plane of reference and a substantially limited dimension along an axis orthogonal to said plane.

4. A method for making a holographic image, of a subject, having information content and information spatial density limited to a predetermined amount comprising the steps of:

illuminating said subject with light from a select source to create a reflected wave front having a given information content and a waveform functionally related to said subject;

limiting the information content of a light wave front derived from said reflected wave front;

forming from said information-limited wave front an information limited stereoscopic real image of said subject having reduced information spatial density;

interfering said light forming said stereoscopic real image having limited information content and reduced information spatial density with a reference light beam having a select waveform and phase relationship with said information-limited wave front to form a holographic image;

positioning an image-receiving surface proximate said information-limited real image; and receiving said holographic image on said image-receiving surface.

5. The method for making a holographic image of said subject according to claim 4 wherein: limitation of information content is carried out by blocking all but a select portion of said derived wave front, and said stereoscopic real image is formed from said select portion.

6. The method for making a holographic image according to claim 4 wherein said information-limiting step includes the step of:

occluding all but a select portion of said derived wave front by passing said select portion through an aperture having a select aspect ratio.

7. The method for making a holographic image according to claim 6 further including the step of: forming said aperture so as to transmit a greater amount of horizontal parallactic information than vertical parallactic information.

8. The method for making a holographic image according to claim 4 wherein said information-limiting step comprises:

transferring a select portion of said derived wave front through an aperture having an aspect ratio representing a substantially large dimension in a direction parallel to a given plane of reference and a substantially limited dimension along an axis orthogonal to said plane.

9. The method for making a holographic image according to claim 4 wherein said step of illuminating said subject is carried out with a source of coherent light.

10. A method for making a holographic image of a subject having a predeterminately limited information content and information spatial density, comprising the steps of:

illuminating said subject with coherent light to create a reflected wave front having a given information content and a waveform functionally related to said subject;

receiving said reflected wave front on an image-receiving surface;

interferring a first coherent reference light having selected waveform and direction with said reflected wave front at said image-receiving surface to form a first holographic image;

illuminating said first holographic image with coherent light having the time reverse waveform of said first reference light;

limiting the information content of a light wave front diffracted by said holographic image from said time reverse waveform;

reconstructing a three-dimensional information limited stereoscopic real image of said subject;

receiving said information-limited real image on a second image-receiving surface proximate said information-limited real image; and interferring a second coherent reference light having selected waveform and direction with said information-limited real image at said second image receiving surface to form said information-limited holographic image.

11. The method for making an information-limited holographic image according to claim 10 including the step of recording said first holographic image on said first image-receiving surface.

12. The method for making an information-limited holographic image according to claim 11 wherein said information-limiting step comprises:

occluding all but a select portion of said first holographic image by placing adjacent thereto an aperture having a select aspect ratio representing a substantially large horizontal dimension and a substantially limited vertical dimension.

13. The method for making an information-limited holographic image according to claim 11 wherein said information-limiting step comprises:

limiting the area of said first image-receiving surface to a select aspect ratio representing a substantially large dimension in a direction parallel to a given plane of reference and a substantially limited dimension along an axis orthogonal to said plane.

14. The method for making an information-limited hologram according to claim 10 including the step of recording said information-limited holographic image.

15. A method for forming a stereoscopic image of a subject comprising the steps of:

illuminating said subject with light from a selected source to create a wave front reflecting therefrom having a given information content related to said subject;

limiting the information content of a wave front derived from said reflecting wave front by transferring a select portion of said derived wave front through an aperture having an aspect ratio representing a substantially large horizontal dimension and a substantially limited vertical dimension;

forming an information-limited real image of said subject from said information-limited derived wave front, combining said information-limited real image with a reference wave front of light having a select phase relationship with said information-limited wave front to form an interference pattern;

positioning an image-receiving surface proximate said information limited real image;

receiving said interference pattern on said image-receiving surface; and illuminating said image-receiving surface, having said interference pattern, with the time reverse waveform of said reference wave front to form a real image of said aperture thereby providing a point of observation for said stereoscopic image of said subject.

16. The method for forming a stereoscopic image according to claim 15 wherein the step of illuminating said image-receiving surface includes using a vertical line source of light.

17. A system for transmitting information from which stereoscopic images of a subject can be formed, comprising:

means for illuminating said subject with light from a selected source to create a reflected wave front having a given information content and a waveform functionally related to said subject;

means for limiting the information content of light wave front derived from said reflected wave front, said means including a narrow horizontal aperture;

means, including lens means positioned proximate said aperture, for forming from said information-limited wave front a stereoscopic real image of said subject having limited information content and spatial density;

means for interferring said light forming said stereoscopic real image having limited information content and spatial density with a reference light beam having a select waveform and phase relationship with said information-limited wave front to form a holographic image;

means for introducing said holographic image to an image-receiving surface proximate said stereoscopic real image;

means for scanning said image-receiving surface to form video signals representative of said holographic image; and means for transmitting said video signals.

* * * * *

Disclaimer

3,633,989.—*Stephen A. Benton,* Cambridge, Mass. METHOD FOR MAKING REDUCED BANDWIDTH HOLOGRAMS. Patent dated Jan. 11, 1972. Disclaimer filed July 5, 1984, by the assignee, *Polaroid Corp.*

Hereby enters this disclaimer to claims 1, 2, 4, 5, 9, 10, 11 and 14 of said patent.

[*Official Gazette October 2, 1984.*]